May 19, 1942.  P. M. FREER  2,283,673
FRICTION COUPLING
Filed Aug. 2, 1940
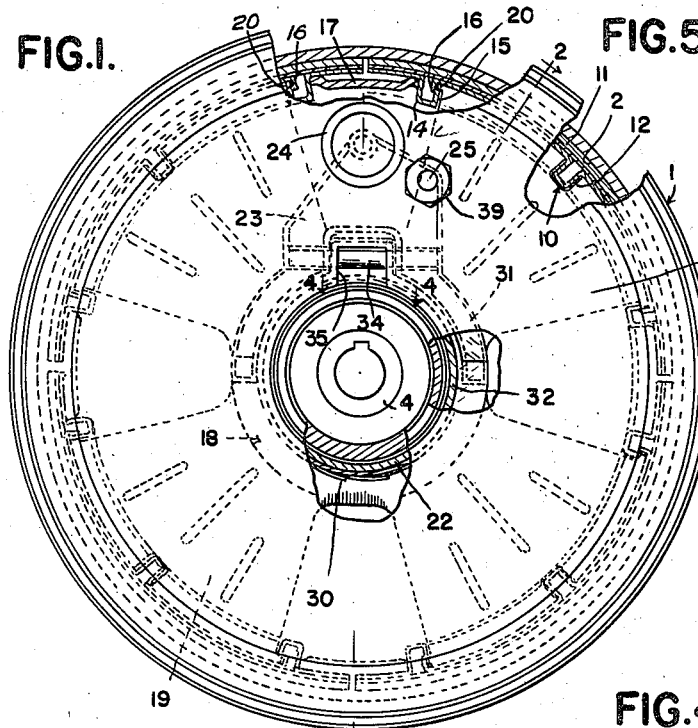
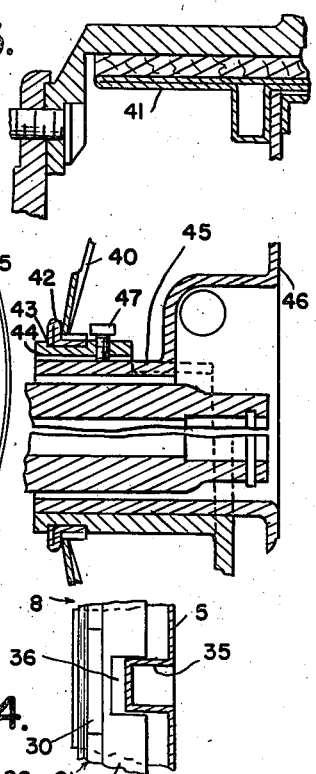
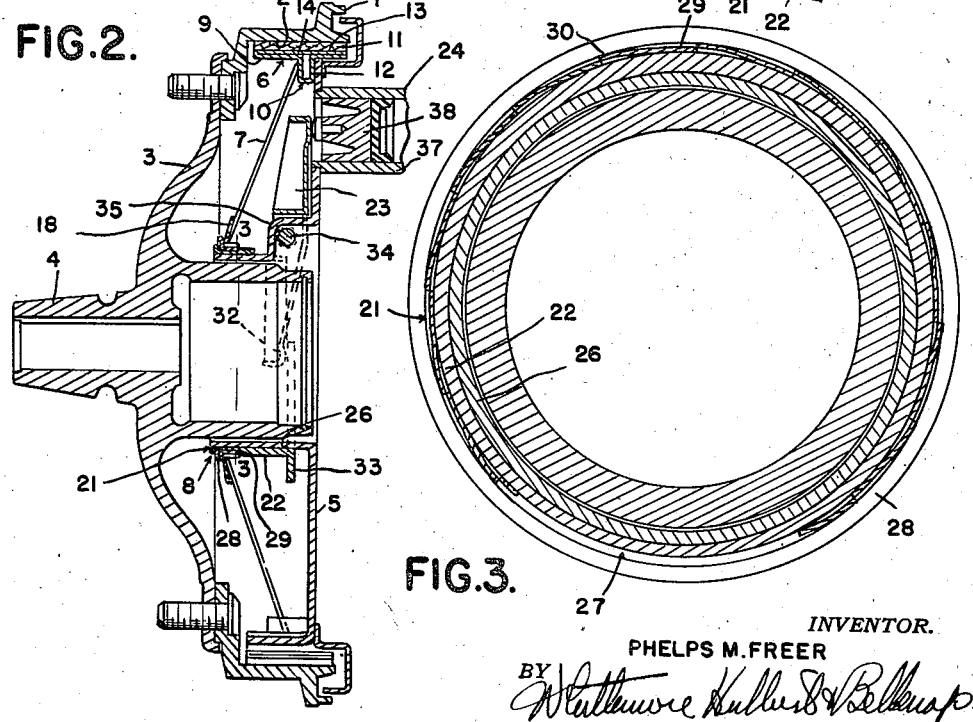
INVENTOR.
PHELPS M. FREER
BY
ATTORNEYS Patented May 19, 1942

2,283,673

UNITED STATES PATENT OFFICE 2,283,673

FRICTION COUPLING

Phelps M. Freer, Detroit, Mich.

Application August 2, 1940, Serial No. 349,884

9 Claims. (Cl. 188—78)

The invention relates to friction couplings for effecting a common state of motion or rest of a plurality of relatively rotatable elements. If both elements are rotatable, the coupling is a clutch, while if one element is rotatable and the other is non-rotatable, the coupling is a brake.

The invention has for one object to provide an improved friction coupling comprising relatively movable members constructed to effectively frictionally engage each other in operative position and to be completely frictionally disengaged from each other in inoperative position.

The invention has for another object to provide an improved mounting for one of the members; to secure centering of the friction member carried thereby with the other of the members in inoperative position; and to eliminate drag of the friction member on the other of the members in inoperative position.

With these and other objects in view, the invention resides in the novel features of construction and combinations and arrangements of parts as more fully hereinafter set forth.

In the drawing:

Figure 1 is an elevation with parts broken away of a friction coupling embodying my invention;

Figure 2 is a cross section on the line 2—2 of Figure 1;

Figure 3 is an enlarged cross section on the line 3—3 of Figure 2;

Figure 4 is a cross section on the line 4—4 of Figure 1;

Figure 5 is a view similar to Figure 2 showing another embodiment of my invention.

The friction coupling illustrated in the present instance is a brake in which one of the elements is rotatable and the other of the elements is non-rotatable. The rotatable element comprises the brake drum 1 having the internal friction face 2. The brake drum, as shown, is mounted upon the fixed flange 3 of the hub 4, the fixed flange being provided with suitable means for securing a vehicle wheel thereto.

The non-rotatable element forms a self-contained unit and comprises the backing plate 5 in generally concentric relation to the brake drum, the friction member 6 engageable with the internal friction face 2 of the brake drum, the dished disc 7 for actuating the friction member, and the mechanism 8 for actuating the disc. The backing plate is fixed either upon the axle housing or the steering spindle of the vehicle. The friction member 6 is formed, as shown, of the series of generally T-section brake shoes 9 each having the sheet metal body 10 and a suitable friction lining 11 for engaging the internal friction face of the brake drum. Each sheet metal body has the generally channel-shaped web 12 and the axial flange 13 which extends beyond the sides of the web. The web has near its ends the axial portions 14 which extend from one side of the web and are provided with the projections 15 extending peripherally toward the middle of the body and radially spaced from the axial flange 13 to provide the recesses 16 which open peripherally toward the middle of the body. The side of the web opposite the axial portions slidably engages the backing plate 5. The ends of the axial portion opposite the projections 15 slidably engage the side edges of the tongues 17 which extend axially from the periphery of the backing plate 5 and are preferably integral therewith. The construction is such that the brake shoes are guided radially by the backing plate and its tongues, which latter also serve as abutments for the brake shoes to limit their peripheral movement.

The dished disc 7 is resilient, it being formed of spring material and being dished rearwardly and toward the webs of the brake shoes and retaining the webs against the backing plate. The disc has the central portion or hub 18 and the spokes 19 radiating from the hub, there being preferably one spoke for each brake shoe. Each spoke has at the outer ends of its side edges the peripheral projections 20 having a radial dimension to closely fit in the recesses 16 of the associated brake shoe. As a result, each spoke is connected to its brake shoe to positively move the same radially toward or away from the internal friction face of the brake drum without any lost motion, except that due to working clearances or tolerances. However, the connection between each spoke and its brake shoe provides for peripheral movement of the brake shoe relative to the spoke, there being clearance in a peripheral direction between each spoke and its projections and the axial portions of the brake shoes. As a result, the actuating disc positively moves the brake shoes toward and away from the internal friction face of the brake drum and at the same time the spokes of the disc are free from torsion except that resulting from friction between the brake shoes and the spokes when the former move peripherally relative to the latter.

The actuating mechanism 8 comprises the mounting collar 21, the sleeve 22, the lever 23, and the wheel cylinder 24 and actuator rod 25 for actuating the lever. The sleeve encircles and engages the forwardly turned annular flange 26 of the backing plate 5, the annular flange being generally concentric with the brake drum and encircling and being preferably spaced from the rear portion of the hub 18. The front end of the sleeve is formed with the annular groove 27 in which is located the mounting collar 21. The mounting collar is formed with the radial flange 28 and the axial flange 29, the latter being provided with the annular series of peripherally extending tongues 30 struck out therefrom. The radial flange abuts the front face of the hub 18 of the disc and the resilient tongues abut the inner edge of the hub of the disc. The annular groove 27 is eccentric with respect to the sleeve and has its axis vertically above the axis of the sleeve so that the mounting collar is eccentrically located with respect to the brake drum and its friction face and compensates for the manufacturing clearances or tolerances in radial directions between the spokes of the disc and the brake shoes to an extent to substantially center the brake shoes relative to the internal friction face of the brake drum when the disc is in its inoperative or off position. The eccentric mounting collar also provides for possible eccentricity of the brake drum relative to the backing plate caused either by manufacturing clearances or tolerances, or bearing wear or misalignment, or both. However, by reason of the resilient tongues formed on the mounting collar, the disc and the brake shoes carried thereby are centered with respect to the internal friction face of the brake drum when the brake shoes are engaged with the friction face to assure more complete and effective frictional engagement.

The lever 23 of the actuating mechanism 8 is bifurcated and the ends of its furcations 31 are formed with rounded bearings 32 for engaging the front face of the substantially semi-circular radial flange 33 formed upon the rear end of the sleeve 22. The lever is mounted upon the ends of the shaft 34 which extends through the side walls of the depression 35 in the backing plate 5. For the purpose of holding the sleeve 22 from rotation to assure locating the axis of the mounting collar above the axis of the sleeve, the sleeve is formed in the upper portion of its rear end with the slot 36, the side edges of which are engageable with the side walls of the depression 35. The length of the slot is such that the sleeve may be moved rearwardly sufficiently to cause the desired axial movement of the hub of the disc.

The wheel cylinder 24 of the actuating mechanism 8 is formed in any usual manner and, as shown, comprises the cylinder 37 and the piston 38, the former being mounted upon the backing plate 5 and the latter being engageable with the free upper end of the lever 23. The actuator rod 25 preferably extends through the nipple 39 adjustably threadedly engaging the backing plate 5 and the front end of the rod is engageable with the free upper end of the lever. The nipple is also engageable with the free upper end of the lever to limit its rearward movement when the disc is resuming its normal position. This structure is clearly shown in my copending application Ser. No. 349,882, filed August 2, 1940.

From the above description, it will be readily seen that upon actuation of the free upper end of the lever by either the wheel cylinder or the actuator rod, the dished disc will be flattened through the intermediate mounting collar and the sleeve on which it is mounted. The flattening of the disc causes the same to expand and to increase its outer diameter, thereby moving the brake shoes radially outwardly against the internal friction face of the brake drum to apply the brake. By reason of the resilient mounting collar, the brake shoes are forced into complete and uniform contact with the internal friction face of the brake drum when the brake is applied. Upon release of pressure of the braking liquid, or of pressure upon the actuating rod, the disc because of its inherent resiliency resumes its normal dished state and in contracting moves the brake shoes radially inwardly and away from the internal frictional face of the brake drum. Also, the disc axially moves the sleeve through the mounting collar and the sleeve in turn moves the lever to contact its free upper end with the adjustable nipple, at which time the parts are in their inoperative or off position. By reason of the eccentricity of the collar, all of the brake shoes and particularly the lower brake shoe or brake shoes are completely out of contact with the internal friction face of the brake drum at this time so that drag is avoided.

Figure 5 discloses a modified construction of mounting for the actuating disc 40 which is constructed in the same manner as the disc 7 and is operatively connected at its periphery to the brake shoes 41, the latter being constructed in exactly the same manner as the brake shoes 9. In detail, the disc 40 is mounted upon the resilient mounting collar 42 formed in the same manner as the mounting collar 21, but the mounting collar 42 is located in the annular slot 43 which is concentrac with the sleeve 44 in which the slot is formed. The sleeve 44 is formed in the same manner as the sleeve 22 and is adapted to be operated in the same manner as disclosed in Figures 1 to 4, inclusive. However, it is eccentrically positioned with respect to the forwardly turned central annular flange 45 upon the backing plate 46 by means of the set screw 47 which is threaded into the uppermost portion of the sleeve and abuts the rests on the annular flange. The set screw is manually adjustable to vary the eccentricity of the disc and brake shoes, as desired, to compensate for the manufacturing clearances and tolerances and also bearing misalignment and wear, and the like, to concentrically position the brake shoes in relation to the brake drum. The operation of the brake illustrated in this figure is the same as that of Figures 1 to 4, inclusive.

What I claim as my invention is:

1. In a friction coupling, the combination of relatively rotatable elements, one of said elements having an internal friction face and the other of said elements comprising a friction member movable radially into engagement with said friction face, actuating means for said friction member comprising a member the inner portion of which is axially movable and the outer portion of which is radially movable and operatively connected to said friction member and means for axially moving the inner portion of said last mentioned member, and eccentric means other than said actuating means for mounting said last mentioned member to concentrically position said friction member relative to said element having said friction face.

2. In a friction coupling, the combination of relatively rotatable elements, one of said elements having an internal friction face and the other of said elements comprising a friction member movable radially into engagement with said friction face, actuating means for said friction member comprising a member the inner portion of which is axially movable and the outer portion of which is radially movable and operatively connected to said friction member and means for axially moving the inner portion of said last mentioned member, and axially movable eccentric means other than said actuating means for mounting said last mentioned member to concentrically position said friction member relative to said element having said friction face.

3. In a friction coupling, the combination of relatively rotatable elements, one of said elements having an internal friction face and the other of said elements comprising a friction member movable radially into engagement with said friction face, a resilient dished disc operatively connected to said friction member and adapted when being flattened to radially move said friction member against said friction face, and a mounting for said disc having its axis eccentric to that of said element having said friction face.

4. In a friction coupling, the combination of two elements rotatable relative to each other about a generally horizontal axis, one of said elements having an internal friction face and the other of said elements comprising a friction member movable radially into engagement with said friction face, and a resilient dished disc operatively connected to said friction member and adapted when being flattened to radially move said friction member against said friction face and when being allowed to resume its normal dish to radially move said friction member away from said friction face, and an axially movable mounting for said disc having its axis above that of said element having said friction face.

5. In a friction coupling, the combination of relatively rotatable elements, one of said elements having an internal friction face and the other of said elements comprising a friction member movable radially into engagement with said friction face, and actuating means for said friction member comprising a member the inner portion of which is axially movable and the outer portion of which is radially movable and operatively connected to said friction member, a reciprocable member, and a mounting collar eccentrically positioned upon said reciprocable member to concentrically position said friction member relative to said element having said friction face.

6. In a friction coupling, the combination of relatively rotatable elements, one of said elements having an internal friction face and the other of said elements comprising a friction member movable radially into engagement with said friction face, a resilient dished disc operatively connected to said friction member and adapted when being flattened to radially move said friction member against said friction face, a reciprocable member mounted in substantially concentric relation to said element having said friction face, and a yieldable collar eccentrically mounted on said reciprocable member and supporting said friction member in concentric relation to said element having said friction face.

7. In a friction coupling, the combination with relatively rotatable elements, one of said elements having an internal friction face and the other of said elements comprising a friction member movable radially into engagement with said friction face, a resilient dished disc operatively connected to said friction member and adapted when being flattened to radially move said friction member against said friction face, a reciprocable sleeve carrying said disc, and means for eccentrically positioning said sleeve with respect to said element having said friction face to concentrically position said friction member with respect to said element having said friction face.

8. In a friction coupling, the combination of two elements rotatable relative to each other about a generally horizontal axis, one of said elements having an internal friction face and the other of said elements comprising a friction member movable radially into engagement with said friction face, a resilient dished disc operatively connected to said friction member and adapted when being flattened to radially move said friction member against said friction face and when being allowed to resume its normal dish to radially move said friction member away from said friction face, a plate substantially concentric with said element having said friction face, a reciprocable sleeve upon said plate carrying said disc, and adjustable means for eccentrically locating said sleeve with respect to said plate to concentrically position said friction member with respect to said element having said friction face.

9. In a friction coupling, the combination of relatively rotatable elements, one of said elements having a friction face and the other of said elements comprising a friction member movable into engagement with said friction face, an actuating member operatively connected to and carrying said friction member and having an axially movable portion, and a mounting for said actuating member having its axis eccentric to that of said element having said friction face to position said friction member in concentric relation to said element having said friction face.

PHELPS M. FREER.